United States Patent
Arnold, II

(10) Patent No.: US 7,518,570 B2
(45) Date of Patent: Apr. 14, 2009

(54) METHOD AND APPARATUS FOR MINIATURIZING DIGITAL LIGHT PROCESSING DISPLAYS USING HIGH REFRACTIVE INDEX CRYSTALS

(75) Inventor: Gordon Leslie Arnold, II, Frisco, TX (US)

(73) Assignee: International Business Machines Corporation, Armonk, NY (US)

( * ) Notice: Subject to any disclaimer, the term of this patent is extended or adjusted under 35 U.S.C. 154(b) by 624 days.

(21) Appl. No.: 11/032,208

(22) Filed: Jan. 10, 2005

(65) Prior Publication Data

US 2006/0152456 A1 Jul. 13, 2006

(51) Int. Cl.
*G09G 3/00* (2006.01)

(52) U.S. Cl. ............... 345/32; 345/31; 345/84; 345/85; 345/166; 345/691; 353/31; 353/33; 353/49; 353/50; 353/51; 359/630; 359/631; 349/5

(58) Field of Classification Search ............ 345/84, 345/31, 204, 207, 211–215, 108, 32, 85, 345/691; 353/31, 33, 49, 50, 51, 81, 82, 353/99; 359/40, 140, 630, 631; 349/5
See application file for complete search history.

(56) References Cited

U.S. PATENT DOCUMENTS

| | | | | |
|---|---|---|---|---|
| 4,933,751 A | * | 6/1990 | Shinonaga et al. | 348/339 |
| 5,079,544 A | * | 1/1992 | DeMond et al. | 345/84 |
| 5,214,420 A | * | 5/1993 | Thompson et al. | 345/6 |
| 5,221,982 A | * | 6/1993 | Faris | 349/115 |
| 5,264,951 A | * | 11/1993 | Takanashi et al. | 349/25 |
| 5,594,591 A | * | 1/1997 | Yamamoto et al. | 349/5 |
| 5,612,753 A | * | 3/1997 | Poradish et al. | 348/743 |
| 5,986,815 A | * | 11/1999 | Bryars | 359/634 |
| 6,082,861 A | * | 7/2000 | Dove et al. | 353/20 |
| 6,183,091 B1 | * | 2/2001 | Johnson et al. | 353/20 |
| 6,340,230 B1 | * | 1/2002 | Bryars et al. | 353/31 |
| 6,406,148 B1 | * | 6/2002 | Marshall et al. | 353/31 |
| 6,498,632 B1 | * | 12/2002 | Butterworth et al. | 349/77 |
| 6,513,934 B1 | * | 2/2003 | Okuyama | 353/31 |

(Continued)

FOREIGN PATENT DOCUMENTS

JP 2004085813 A 3/2004

OTHER PUBLICATIONS www.insightmedia.info/summaries/july00.htm—ColorLink: solid state alternative to a color wheel.

*Primary Examiner*—My-Chau T Tran
*Assistant Examiner*—Jennifer T Nguyen
(74) *Attorney, Agent, or Firm*—Yee & Associates, P.C.; Justin M. Dillon

(57) ABSTRACT

A digital light processing display system is provided with fewer major moving parts and a smaller form factor. A high-intensity, high-frequency strobe light is used to direct a pulse of light through colored filters. The colored pulses of light are passed through separate prisms, each with a high index of refraction. The index of refraction and the length of the path through the prism result in a delay for each color. For each pixel with a component of the color for each colored pulse, a controller activates the corresponding mirror in an array of mirrors. The timing of the activation of the mirrors is coordinated with the timing of the colored pulses of light to form a full color image.

8 Claims, 3 Drawing Sheets

U.S. PATENT DOCUMENTS

| | | | |
|---|---|---|---|
| 6,567,134 B1 * | 5/2003 | Morgan | 348/743 |
| 6,644,813 B1 * | 11/2003 | Bowron | 353/31 |
| 6,704,065 B1 * | 3/2004 | Sharp et al. | 349/5 |
| 7,061,512 B2 * | 6/2006 | Morgan et al. | 345/691 |
| 7,283,181 B2 * | 10/2007 | Allen et al. | 348/744 |
| 7,321,464 B2 * | 1/2008 | Ouderkirk et al. | 359/495 |
| 2001/0000971 A1 * | 5/2001 | Johnson et al. | 349/117 |
| 2002/0101546 A1 * | 8/2002 | Sharp et al. | 348/760 |
| 2002/0122159 A1 * | 9/2002 | Choi | 353/31 |
| 2004/0004675 A1 * | 1/2004 | Honda | 348/744 |
| 2004/0012831 A1 * | 1/2004 | Kim et al. | 359/15 |
| 2004/0207924 A1 * | 10/2004 | Chen | 359/634 |
| 2006/0152456 A1 * | 7/2006 | Arnold, II | 345/84 |
| 2006/0256143 A1 * | 11/2006 | Kuekes et al. | 345/698 |

* cited by examiner

METHOD AND APPARATUS FOR MINIATURIZING DIGITAL LIGHT PROCESSING DISPLAYS USING HIGH REFRACTIVE INDEX CRYSTALS

BACKGROUND OF THE INVENTION

1. Technical Field

The present invention relates to display devices and, in particular, to digital light processing displays. Still more particularly, the present invention provides a method and apparatus for miniaturizing digital light processing displays using high refractive index crystals.

2. Description of Related Art

Digital light processing (DLP™) is a technology from Texas Instruments for projecting color displays. DLP™ displays use very large scale integration (VLSI) to fabricate thousands of tiny mirrors on a chip. The mirrors are on hinges on top of a static random access memory (SRAM) array. Each mirror is capable of switching a pixel of light. A DLP™ chip may also include video processing components for converting analog signals to digital and for converting digital video signals into signals necessary to time the switching of the mirrors. The array of mirrors may be referred to as a digital micromirror device (DMD™)

FIG. 1 illustrates an example of a conventional digital light processing display system. DLP™ displays give a very high resolution and use a well understood technology. Since the mirrors that are used reflect any type of light, the DLP™ array of mirrors must first display one color, then another, and then a third (usually red, green, and blue) in rapid succession. The human eye is then capable of merging the colors as necessary. For example, red light and green light and blue light are all projected in succession, the human eye will merge these colors into white light.

To generate these colors, a high intensity light is shown through a filter wheel. A motor typically spins the wheel, rotating three colored filters in succession in front of the light. A controller synchronizes the switching of the mirrors with the timing of the colored filters. The controller may be a separate component or part of the DLP™ chip. The resulting light is reflected by the appropriate subset of the mirrors and projected onto precise pixels on a screen.

SUMMARY OF THE INVENTION

The present invention provides a digital light processing display system with fewer major moving parts and a smaller form factor. A high-intensity, high-frequency strobe light is used to direct a pulse of light through colored filters. The colored pulses of light are passed through separate prisms, each with a high index of refraction. The index of refraction and the length of the path through the prism result in a delay for each color. For each pixel with a component of the color for each colored pulse, a controller activates the corresponding mirror in an array of mirrors. The timing of the activation of the mirrors is coordinated with the timing of the colored pulses of light to form a full color image.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
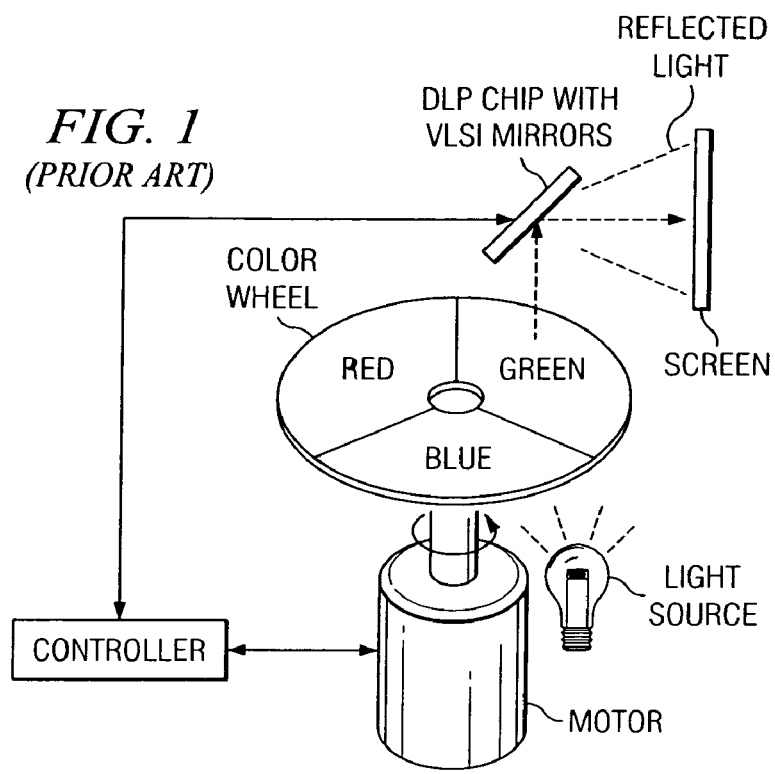
FIG. 1 illustrates an example of a conventional digital light processing display system.

FIGS. 2A-2D illustrate display systems in accordance with exemplary embodiments of the present invention. More particularly with reference to FIG. 2A, light source 208 projects a pulse of white light through colored filters 202, 204, 206. The white light may be separated into component colors, such as additive primary colors red, green, and blue. For example, filter 202 may be a red filter, filter 204 may be a green filter, and filter 206 may be a blue filter. Other combinations of component colors may also be used as long as the component colors combine to form white light. For example, the component colors may include cyan, yellow, and magenta.

The pulsed white light source shines through the filters and two of the filters lead into the prism set 210. In the example depicted in FIG. 2A, prism set 210 includes two separate prisms. The first color is reflected and not slowed down. The second color is passed through the prism and is marginally slowed down by the index of refraction of the prism. The third color is passed through a larger prism in prism set 210 and is slowed down more, by a higher index of refraction and by virtue of traveling a greater distance through the medium of the prism.

This slowdown can be calculated by determining the amount of time spent in the prism and subtracting the amount of time spent by traveling the same distance through a vacuum.

$$\text{delay} = \frac{R_p D}{C} - \frac{R_a D}{C},$$

where D s the distance through the prism, C is the speed of light, $R_p$ is the refractive index of the prism, and $R_a$ is the refractive index of the normal medium, usually either a vacuum or air. For a vacuum (or air to four decimal places), $R_a$ becomes 1 and the equation reduces to the following:

$$\text{delay} = \frac{D(R_p - 1)}{C}$$

The amount of slowdown necessary is dependent also on the pulse pattern of the white light, which, in turn, is dependent upon the speed at which the individual mirrors in the array can switch on and off. Ideally, the white light pulse should be at least ⅓ of a cycle and should be separated into three distinct pulses of colored light, each taking ⅓ of a cycle. The array of mirrors would need to be able to switch at a fast enough rate to accommodate the separate pulses of light. Light source 208 may be, for example, a high-intensity strobe light.

Figure 2A:
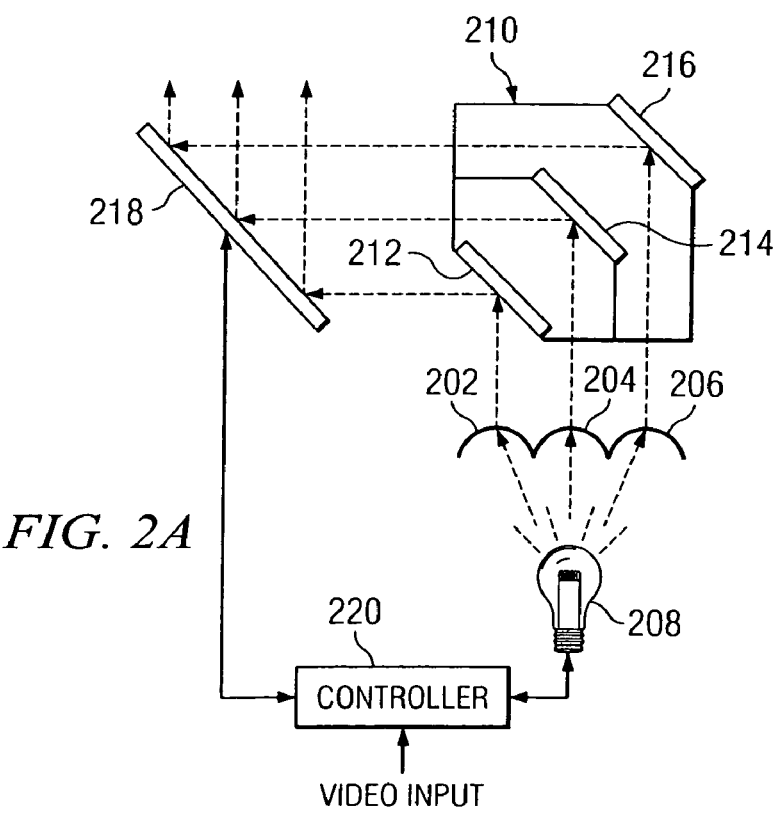
FIGS. 2A-2D illustrate display systems in accordance with exemplary embodiments of the present invention.

In the example shown in FIG. 2A, the light that passes through filter 202 reflects off of reflective surface 212 onto an array of mirrors 218, which sees a first pulse of light having the color of filter 202. The light that passes through filter 204 passes through prism set 210 and reflects off of reflective surface 214 onto mirror array 218, which then sees a second pulse of light having the color of filter 204. The refractive index of the prism and the distance traveled through the prism causes the second pulse of light to arrive at mirror array 218 after the first pulse of light.

The light that passes through filter 206 passes through prism set 210 and reflects off of reflective surface 216 onto mirror array 218, which then sees a third pulse of light having the color of filter 206. The refractive index of the prism and the distance traveled through the prism causes the third pulse of light to arrive at mirror array 218 after the first and second pulses of light.

Controller 220 coordinates the timing of light source 208 with mirror array 218 based on video input, which may be a digital video signal. For each pixel with a component of the color for each colored pulse, controller 220 activates the corresponding mirror in mirror array 218. The timing of the activation of the mirrors is coordinated with the timing of the colored pulses of light to form a full color image. The individual mirrors in mirror array 218 reflect the rapid succession of colored pulses of light onto a display screen (not shown). The display system shown in FIG. 2A may be a rear projection display system or a front projection system.

Each pixel on the screen, at moment, may have a color with zero or more component colors. For example, for a black pixel, mirror array 218 may reflect no component colors. For a yellow pixel, mirror array 218 may reflect a red pulse and a green pulse. For a white pixel, mirror array 218 may reflect all component colors. The human eye naturally combines these component colors to form a bright, high-resolution image.

Controller 220 and mirror array 218 may be embodied on the same chip, such as a DLP™ chip. Controller 220 may also include other video processing functions (not shown). For example, controller 220 may upconvert a 480i (480 vertical lines interlaced) video input signal to 720p (720 vertical lines progressive scan (non-interlaced)) or may stretch an video image with a 4:3 aspect ratio (standard television) to a 16:9 aspect ratio (widescreen).

Figure 2B:
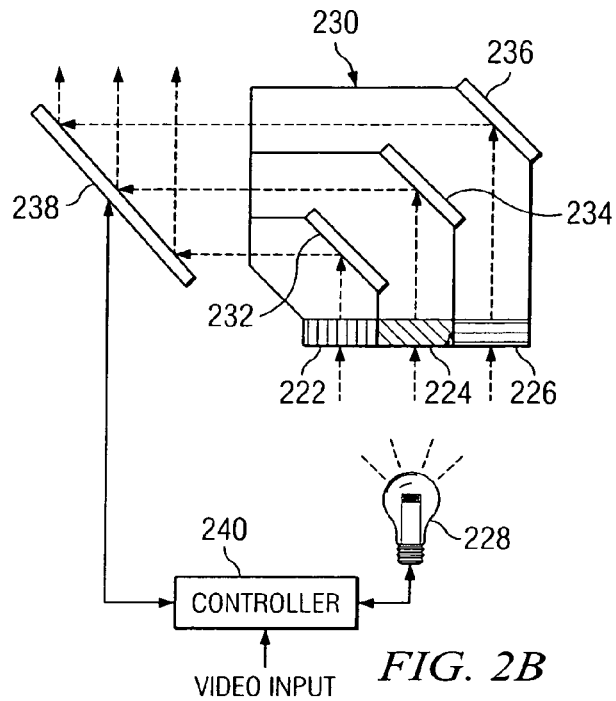

Referring now to FIG. 2B, light source 228 projects a pulse of white light through colored filters 222, 224, 226. In this example, filters 222, 224, 226 may be integrated into prism set 230. In this example, prism set 230 includes three separate prisms, one for each component color. For example, filters 222, 224, 226 may be grown onto prism set 230 using semiconductor fabrication techniques. The white light is then separated into component colors as described above with reference to FIG. 2A.

The light that passes through filter 222 and prism set 230. The pulse of colored light then reflects off of reflective surface 232 onto an array of mirrors 238, which sees a first pulse of light having the color of filter 222. The refractive index of the prism and the distance traveled through the prism may be used to determine the time at which the first pulse of light arrives at mirror array 238. The light that passes through filter 224 passes through prism set 230 and reflects off of reflective surface 234 onto mirror array 238, which then sees a second pulse of light having the color of filter 224. The refractive index of the prism and the distance traveled through the prism causes the second pulse of light to arrive at mirror array 238 after the first pulse of light.

The light that passes through filter 226 passes through prism set 230 and reflects off of reflective surface 236 onto mirror array 238, which then sees a third pulse of light having the color of filter 226. The refractive index of the prism and the distance traveled through the prism causes the third pulse of light to arrive at mirror array 238 after the first and second pulses of light.

Controller 240 coordinates the timing of light source 228 with mirror array 238. For each pixel with a component of the color for each colored pulse, controller 240 activates the corresponding mirror in mirror array 238. The timing of the activation of the mirrors is coordinated with the timing of the colored pulses of light to form a full color image. The individual mirrors in mirror array 238 reflect the rapid succession of colored pulses of light onto a display screen (not shown). The display system shown in FIG. 2B may be a rear projection display system or a front projection system.

Figure 2C:
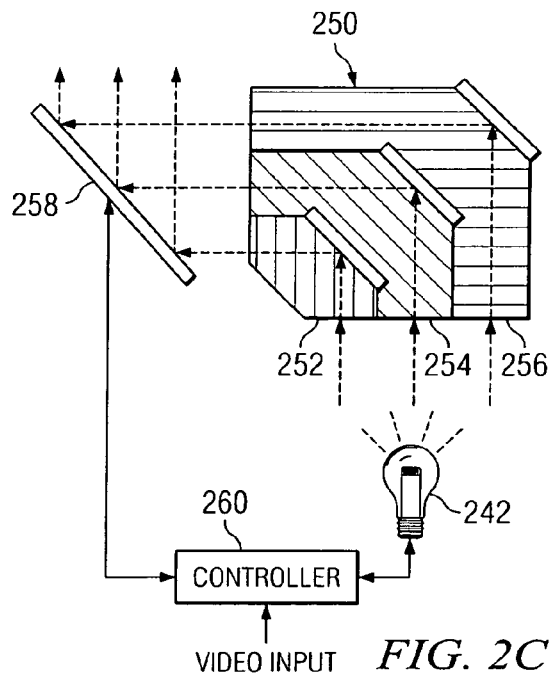

Turning now to FIG. 2C, light source 242 projects a pulse of white light through prism set 250. In this example, prism 250 includes three separate prisms 252, 254, and 256, one for each component color. Each prism may of a different color. For example, prism 256 may consist of properly doped $Al_2O_3$ (sapphire) to act as a blue filter and to provide an index of refraction ($R'_p$) of 1.77. Similarly, prism 254 may provide a green filter and prism with a different index of refraction and prism 252 may provide a red filter and prism with yet another index of refraction. Other combinations of component colors may also be used within the scope of the present invention.

The pulse of white light from light source 242 passes through prism 252 and reflects off of a reflective surface onto array of mirrors 258, which sees a first pulse of light having the color of prism 252. The refractive index of prism 252 and the distance traveled through prism 252 may be used to determine the time at which the first pulse of light arrives at mirror array 258. The pulse of white light also passes through prism 254 and reflects off of a reflective surface onto mirror array 258, which then sees a second pulse of light having the color of prism 254. The refractive index of prism 254 and the distance traveled through prism 254 causes the second pulse of light to arrive at mirror array 258 after the first pulse of light.

Concurrently, the light also passes through prism 256 and reflects off of a reflective surface onto mirror array 258, which then sees a third pulse of light having the color of prism 256. The refractive index of prism 256 and the distance traveled through prism 256 causes the third pulse of light to arrive at mirror array 258 after the first and second pulses of light.

Controller 260 coordinates the timing of light source 242 with mirror array 258. For each pixel with a component of the color for each colored pulse, controller 260 activates the corresponding mirror in mirror array 258. The timing of the activation of the mirrors is coordinated with the timing of the colored pulses of light to form a full color image. The individual mirrors in mirror array 258 reflect the rapid succession of colored pulses of light onto a display screen (not shown). The display system shown in FIG. 2C may be a rear projection display system or a front projection system.

Figure 2D:
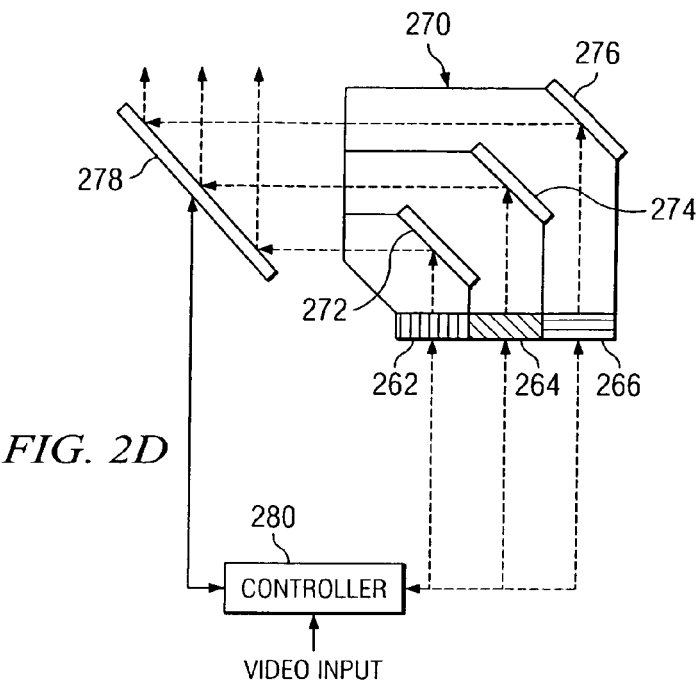

With reference to FIG. 2D, an example display system is shown with filters being integrated with the light source. Light is provided by three separate light sources 262, 264, 266. For example, light source 262 may provide red light, light source 264 may provide green light, and light source 266 may provide blue light. Other combinations of component colors may also be used within the scope of the present invention. Light sources 262, 264, 266 may be, for example, high-intensity light emitting diode (LED) elements, that may or may not be physically integrated into prism set 270.

The pulse of light from light source 262 passes through prism set 270 and reflects off of reflective surface 272 onto array of mirrors 278, which sees a first pulse of light having the color of light source 262. The refractive index of the prism and the distance traveled through the prism may be used to determine the time at which the first pulse of colored light arrives at mirror array 278. The pulse of light from light source 264 passes through prism set 270 and reflects off of reflective surface 274 onto array of mirrors 278, which sees a second pulse of light having the color of light source 264. The refractive index of the prism and the distance traveled through the prism may be used to determine the time at which the second pulse of colored light arrives at mirror array 278.

Concurrently, the pulse of light from light source 266 passes through prism set 270 and reflects off of reflective surface 276 onto array of mirrors 278, which sees a third pulse of light having the color of light source 266. The refractive index of the prism and the distance traveled through the prism may be used to determine the time at which the third pulse of colored light arrives at mirror array 278.

Controller 280 coordinates the timing of light sources 262, 264, 266 with mirror array 278. For each pixel with a component of the color for each colored pulse, controller 280 activates the corresponding mirror in mirror array 278. The timing of the activation of the mirrors is coordinated with the timing of the colored pulses of light to form a full color image. The individual mirrors in mirror array 278 reflect the rapid succession of colored pulses of light onto a display screen (not shown). The display system shown in FIG. 2D may be a rear projection display system or a front projection system.

Having the prism allows for all three diodes to be flashed at once, eliminating the need for a separate controller element that regulates flashing each one separately. Also, if the LEDs are physically integrated, the construction should be easier and more flexible if all the LEDs flash at once. However, in an alternative embodiment, the LEDs may be flashed separately to produce consecutive pulses of colored light, in which case the prisms may be unnecessary.

Figure 3A:
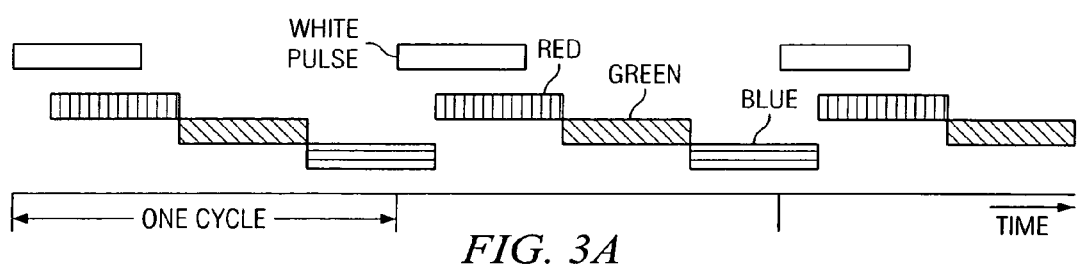
FIGS. 3A and 3B illustrate timing for colored pulses of light in accordance with exemplary embodiments of the present invention.
Figure 3B:
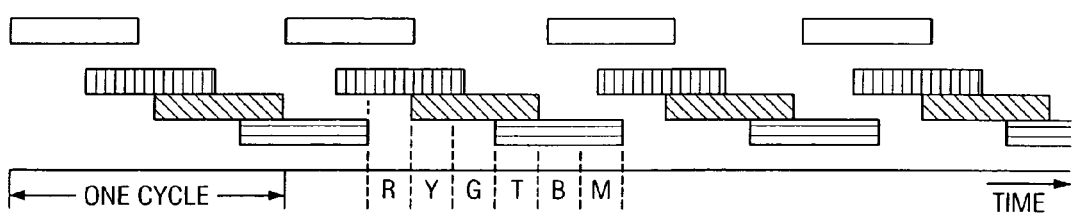

FIGS. 3A and 3B illustrate timing for colored pulses of light in accordance with exemplary embodiments of the present invention. More particularly, with reference to FIG. 3A, a pulse of white light is provided by a light source at the beginning of each cycle. After a short delay, a pulse of a first color, such as red for example, arrives the mirror array. The next pulse of a second color, such as green for example, arrives at the mirror array. The second pulse may be delayed precisely by balancing the distance to be traveled through a prism and the index of refraction for the prism, as described above. After yet another delay, a third pulse of light having a third color, such as blue for example, arrives at the mirror array.

As can be seen, the mirror array sees a pulse of red, a pulse of green, and a pulse of blue during each cycle. A controller may then turn on or off each individual mirror depending upon whether the pixel corresponding to a mirror is to have a component of the current color. For example, a mirror may remain turned on for an entire cycle to reflect all three component colors, resulting in a white pixel. As another example, a mirror may remain turned on during the red pulse and the green pulse and turn off during the blue pulse to produce a yellow pixel (red light+green light=yellow light). The human eye will naturally combine the light components to see the proper colors.

FIG. 3B illustrates an example with overlapping colored pulses. A pulse of white light is provided by a light source at the beginning of each cycle. After a short delay, a pulse of a first color, such as red, for example, arrives at the mirror array. The next pulse of a second color, such as green, for example, arrives at the mirror array. The second pulse may be delayed precisely by balancing the distance to be traveled through a prism and the index of refraction for the prism, as described above. After yet another delay, a third pulse of light having a third color, such as blue, for example, arrives at the mirror array.

However, in this example, the green pulse begins before the red pulse ends and the blue pulse begins before the green pulse ends. At the beginning of the next cycle, the red pulse overlaps the blue pulse from the preceding cycle. Therefore, besides reflecting red, green, and blue light, the mirror array is also capable of reflecting combinations of these light components. During a given cycle, the mirror array sees red, yellow, green, teal, blue, and magenta.

Figure 4:
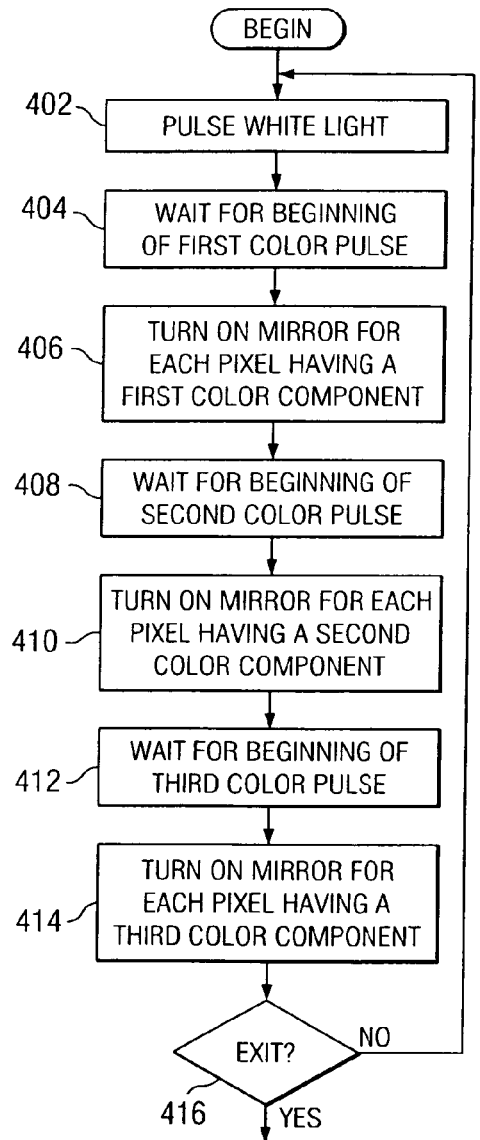
FIG. 4 is a flowchart illustrating operation of a display system in accordance with an exemplary embodiment of the present invention.

FIG. 4 is a flowchart illustrating operation of a display system in accordance with an exemplary embodiment of the present invention. Operation begins and a light source shines a pulse of white light (block 402). Then, a controller waits for the beginning of a first color pulse of light (block 404) and turns on a mirror for each pixel having a first color component (block 406).

Next, the controller waits for the beginning of a second color pulse of light (block 408) and turns on a mirror for each pixel having a second color component (block 410). Thereafter, the controller waits for the beginning of a third color pulse of light (block 412) and turns on a mirror for each pixel having a third color component (block 414).

A determination is made as to whether an exit condition exists (block 416). An exit condition may exist, for example, if the display system is powered down or if an invalid input signal is received. If an exit condition exists, operation ends; otherwise, operation returns to block 402 to emit the next pulse of white light for the next cycle.

The example flowchart in FIG. 4 illustrates operation of a display system with three component colors. However, operation could be modified if more than three component colors are used, as illustrated in FIG. 3B, for example. The controller times the activation of mirrors in a mirror array with the timing of the colored pulses being reflected and/or refracted by a prism set. The timing of the colored pulses may be accurately determined by choosing appropriate values for the distance traveled and index of refraction for each prism in the prism set.

Thus, the present invention solves the disadvantages of the prior art by providing a digital light processing display system with a smaller form factor. Also, by removing the wheel and motor, the display system of the present invention has fewer moving parts and, thus, less likelihood of mechanical failure. The colored filters may be incorporated into the prism set or may be incorporated into the light source. Furthermore, the light source and/or prism set may be easily adapted for VLSI design. For example, the filter and prism structure may be fabricated using the same techniques as the mirror array.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A display system comprising:
   a video input;
   an array of mirrors;
   a light source;
   a set of colored filters; and a set of prisms, wherein the set of prisms includes a first prism and a second prism, wherein the light source shines a pulse of white light through the set of colored filters and the set of prisms to form a first pulse of colored light having a first component color, a second pulse of colored light having a second component color, and a third pulse of colored light having a third component color, wherein the first prism delays the second pulse of colored light by a delay amount based on a distance light travels through the first prism and an index of refraction for the first prism, and wherein a third pulse of colored light is delayed with respect to the second pulse of colored light; and wherein the controller activates a first subset of mirrors in a mirror array to reflect the first pulse of colored light, activates a second subset of mirrors in the mirror array to reflect the second pulse of colored light, and activates a third subset of mirrors in the mirror array to reflect the third pulse of colored light.

2. The display system of claim 1, wherein the second prism delays the third pulse of colored light by a delay amount based on a distance light travels through the second prism and an index of refraction for the second prism.

3. The display system of claim 1, wherein the set of prisms further includes a third prism, wherein the first prism delays the first pulse of colored light by a delay amount based on a distance light travels through the first prism and an index of refraction for the first prism, wherein the second prism delays the second pulse of colored light by a delay amount based on a distance light travels through the second prism and an index of refraction for the second prism, and wherein the third prism delays the third pulse of colored light by a delay amount based on a distance light travels through the third prism and an index of refraction for the third prism.

4. The display system of claim 1, wherein the first component color is red, the second component color is green, and the third component color is blue.

5. The display system of claim 1, wherein the set of prisms includes a plurality of reflective surfaces that reflect the first pulse of colored light, the second pulse of colored light, and the third pulse of colored light toward the array of mirrors.

6. A display system comprising:

a video input;
an array of mirrors;
a light source; and
a set of colored prisms, wherein the set of prisms includes a first prism and a second prism,
wherein the light source shines a pulse of white light through the set of colored prisms to form a first pulse of colored light having a first component color, a second pulse of colored light having a second component color, and a third pulse of colored light having a third component color, wherein the first prism delays the second pulse of colored light by a delay amount based on a distance light travels through the first prism and an index of refraction for the first prism, and wherein the second prism delays the third pulse of colored light by a delay amount based on a distance light travels through the second prism and an index of refraction for the second prism;

wherein the controller activates a first subset of mirrors in a mirror array to reflect the first pulse of colored light, activates a second subset of mirrors in the mirror array to reflect the second pulse of colored light, and activates a third subset of mirrors in the mirror array to reflect the third pulse of colored light.

7. A display system comprising:

a video input;
an array of mirrors;
a first light source having a first component color;
a second light source having a second component color;
a third light source having a third component color; and
a set of prisms, wherein the set of prisms includes a first prism, a second prism, and a third prism,
wherein the first light source shines light through the set of prisms to form a first pulse of colored light having the first component color, the second light source shines light through the set of prisms to form a second pulse of colored light having the second component color, and the third light source shines light through the set of prisms to form a third pulse of colored light having the third component color, wherein the first prism delays the first pulse of colored light by a delay amount based on a distance light travels through the first prism and an index of refraction for the first prism, wherein the second prism delays the second pulse of colored light by a delay amount based on a distance light travels through the second prism and an index of refraction for the second prism, and wherein the third prism delays the third pulse of colored light by a delay amount based on a distance light travels through the third prism and an index of refraction for the third prism; and wherein the controller activates a first subset of mirrors in a mirror array to reflect the first pulse of colored light, activates a second subset of mirrors in the mirror array to reflect the second pulse of colored light, and activates a third subset of mirrors in the mirror array to reflect the third pulse of colored light.

8. The display system of claim 7, wherein the first light source, the second light source, and the third light source are integrated into the set of prisms.

* * * * *